Aug. 31, 1937.  F. A. STEVENS  2,091,722
OPHTHALMIC MOUNTING
Filed Nov. 23, 1935
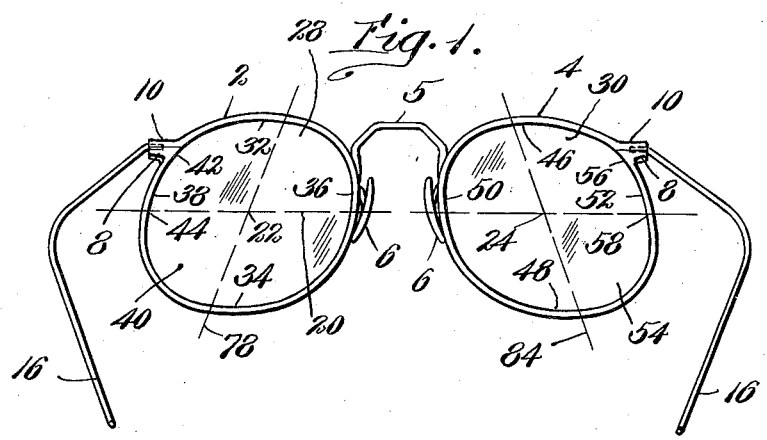
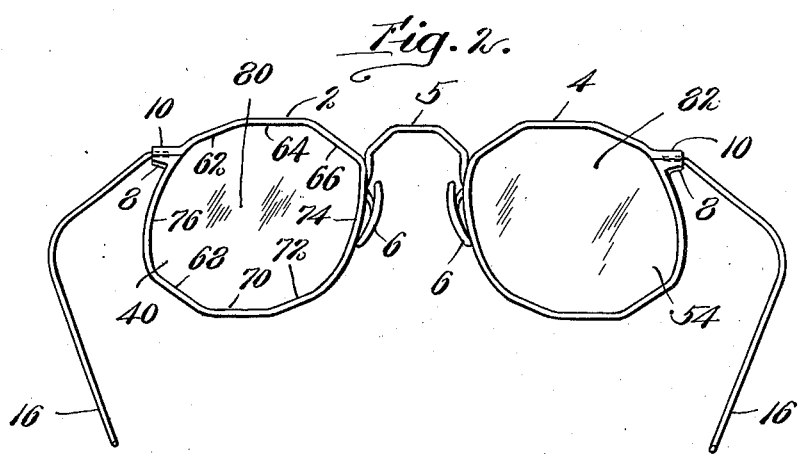
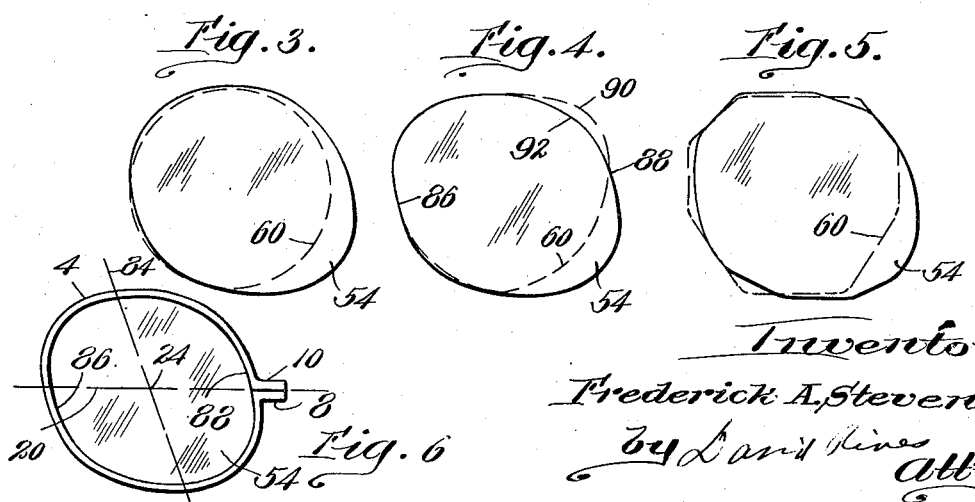
Inventor.
Frederick A. Stevens.
by David Rines
Atty.

Patented Aug. 31, 1937

2,091,722

UNITED STATES PATENT OFFICE 2,091,722

OPHTHALMIC MOUNTING

Frederick Arthur Stevens, Providence, R. I.

Application November 23, 1935, Serial No. 51,308

2 Claims. (Cl. 88—54)

The present invention relates to ophthalmic mountings, and more particularly to ophthalmic, corrective lenses.

When one looks at a distant, or an intermediately positioned, object, one usually turns one's head so as to obtain a direct, frontal view. In the case of near-by objects, that are situated off to one side, or obliquely, however, the head is usually maintained in fixed position, and an indirect view is obtained, over a very wide range, by unconsciously rotating the eye balls through the action of the oblique eye muscles, particularly the superior oblique muscles, the function of which is to rotate the eye balls outward and downward. These oblique muscles are continually called into play unconsciously under ordinary occupational or diversional conditions.

For those with defective vision, whose refractive errors are corrected by corrective lenses, this action of the superior, oblique muscles creates a problem the solution of which has been attempted by raising the temples of the spectacles above the centers of the lenses; the theory being that, when the eye balls begin to roll unconsciously, to the right and to the left, and outward, there will be no obstruction to the view that would otherwise be caused by the presence of the temples if positioned lower down. Such unconscious, outward vision, however, is with the naked eye, and not through the corrective lens; more than that, the vision is still obstructed by marginal portions of the lenses or the lens-holding rims; and these marginal portions are positioned not only horizontally outward, at the positions from which the temples have been removed by this raising, but also outward and downward. It is very important that these obstructions be removed and that the vision be corrected by the glass; and this is particularly so when the eye looks outward, not horizontally, but at a downward incline. If a person crossing the street, for example, should catch a momentary glimpse out of the corner of his eye, of a rapidly approaching automobile, it would be to his advantage to obtain a clear view of the road bed under the vehicle.

When traveling over rough ground, crossing a city street, or driving an automobile, the factor of indirect or oblique outward and downward side-glance vision is most important. It enables one to distinguish objects without looking directly at them, and thus avoid accidents. According to present-day practice, this field is but partly covered with the lens, and the lens boundary at the lens mid-field offers a real obstruction to vision.

It is accordingly an object of the present invention to provide a new and improved ophthalmic mounting that shall provide an adequate lens field, both in shape and dimension, so as to render such clear view possible, and provide for unobstructed outward and downward vision.

It is a further object to provide a new and improved ophthalmic lens, suitable for use with such mounting.

The above results could, of course, be obtained with present-day lenses by enormously increasing their dimensions. It is another object of the present invention, however, to provide these improvements while enhancing the appearance of the lenses and without detracting from their appearance, either as respects shape or size.

Other and further objects will be explained hereinafter and will be particularly pointed out in the appended claims.

The invention will now be explained in connection with the accompanying drawing, in which Fig. 1 is a front elevation of a pair of spectacles embodying the present invention; Fig. 2 is a similar view of a modification; Figs. 3, 4 and 5 are elevations of modified lenses; and Fig. 6 is a similar view showing a lens in another type of rim.

The illustrated ophthalmic mountings comprise a pair of spectacles with two lens-holding rims 2 and 4 connected together by a bridge 5, which may be of the raised type shown, or the saddle type (not shown), that is adapted to rest directly on the wearer's nose, or of any other desired type. Rocking guards 6 may be provided at each end of and below the bridge 5, to engage against the sides of the nose. If the rims 2 and 4 and the bridge 5 are constituted of metal, the rims may be split at points opposite to, or above, the bridge 5, and each rim may be provided at its ends with a pair of end pieces 8 and 10, soldered thereto. The invention is adapted for use also with mountings of the rimless type (not shown) in which case end pieces may be directly secured to clamps, according to well known practice. A temple 16 is received between the end pieces and is mounted to swing about a dowel (not shown). The end pieces 8 and 10 may be secured together, with the temple in place between them, by a screw (not shown).

In some types of spectacles, as in Fig. 6, the split ends of the rims, and the end pieces 8 and 10 carried thereby, are disposed along a dashed line 20, that passes substantially through the centers 22 and 24 of the corrective lenses 28 and 30 carried by the rims 2 and 4. In other types of spectacles, however, as illustrated in Figs. 1 and 2, the split ends of the rims, and the end pieces 8 and 10 carried thereby, are raised substantially above this line 20 of centers of the rims 2 and 4, in order that the eyes of the wearer may have unobstructed vision horizontally outward to the right and to the left, under the temples 16. The present invention is adapted for use with both types of spectacles and with other types of ophthalmic mountings as well, such as eyeglasses, which are unprovided with temples.

The right-hand lens 28 is shown provided with an upper face 32, a lower face 34, an inner face 36 and an outer face 38. The inner face 36 is positioned adjacent to the bridge 5. The outer face 38 has an extreme corrective substantially enlarged lower portion 40 that extends outward, to the right, beyond the periphery of the upper portion 42 and the intermediate portion 44 of the said outer face 38, but without otherwise substantially increasing the lens field. The eye is thus enabled to see through the portion 40 of the lens in a direction outward, or to the right, and also downward, that is, in an oblique direction outward and downward when approximately the center 22 of the lens is positioned directly before the right eye of the wearer.

The left-hand lens 30 is similarly provided with an upper face 46, a lower face 48, an inner face 50 and an outer face 52. The inner face 50 is positioned adjacent to the bridge 5. The outer face 52 has an extreme corrective substantially enlarged lower portion 54 that extends outward, to the left, beyond the periphery of the upper portion 56 and the intermediate portion 58 of the said outer face 52, but without otherwise substantially increasing the lens field. Vision is thus permitted obliquely outward, or to the left, and downward, through the portion 54 when approximately the center 24 of the lens is positioned directly in front of the wearer's left eye.

The lower portions 40 and 54 of the right-hand and left-hand lenses 28 and 30, it will be noted, extend outwardly and downwardly in opposite directions, thus increasing the downwardly oblique lens field to the right of the right-hand lens 28 and to the left of the left-hand lens 30. The wearer of the spectacles or eyeglasses thus has not only his normal field of vision directly in front, but also a larger field of indirect, or obliquely outward and downward side-glance, vision, both to the right and to the left, and downward. This result is attained, furthermore, without unduly increasing the lens field, or increasing it at all except in two outward, downwardly oblique directions, and without impairing the appearance of the lens but, on the contrary, enhancing it.

This will be understood even more clearly from Fig. 3, showing a prior-art lens by dotted lines, and the same lens, as improved by the present invention, in full lines. The full-line lens corresponds to the left-hand lens 30 of Fig. 1. When the wearer's left eye attempts unconsciously to look obliquely downward and outward, to the left, its vision becomes obstructed by the boundary 60 of the prior-art lens. This boundary 60 may be a portion of the lens rim, or it may be the periphery of the lens itself, in the case of rimless lenses; in either case, it is objectionable. More than that, to the left of the boundary 60, the eye must see without the aid of the corrective lens; and this means, in many cases, that the wearer is deprived of vision altogether in that region, to the left of the boundary 60. All these prior-art difficulties are overcome by the presence of the portion 54 of the lens of the present invention. The wearer of the lenses is provided with a substantially larger field for downwardly oblique, outward, "near" vision, when he rolls his eye balls without turning his head. This is a decided advantage where frequency and rapid changes from direct to oblique vision is required. The word "near" is used above and in the claims in the generic sense of including objects relatively near, like an approaching automobile that is close to a person who is crossing a street, and also objects that may be closer still. The word "near" is thus used herein in the sense of distinguishing from the distant and intermediately positioned objects referred to in the first sentence of the second paragraph of this specification.

The same remarks apply, of course, to lenses of other types, two of which are illustrated in Figs. 4 and 5; the prior-art lenses are shown in dotted lines, and the improved lenses of the present invention in full, as in Fig. 3. In some cases, to improve the appearance, the lenses may be further modified, as by moving the dotted line 90 of Fig. 4 back to the full line 92. The present invention thus enables one to use one's favorite shape of lens, but improved so as to provide, not only the straight-ahead vision, but also the above-described, indirect vision that is obtained when the wearer unconsciously turns his eyes slightly to the right or to the left. This is a very important, safety factor under modern conditions of moving, street traffic.

The lenses may, of course, be still further modified and ornamented; as, for example, in Fig. 2. The lenses may be varied substantially both as respects peripheral shape and size, while retaining the advantages of the present invention. In the right-hand lens 80, the upper face, which is constituted of three sides 62, 64 and 66, and the lower face, constituted of three sides 68, 70 and 72, are more or less curvedly parallel to the beforementioned, central, horizontal line 20. The inner side 74 and the outer side 76 are similarly curvedly parallel to an inclined line 78. Similar considerations apply to the left-hand lens 82, except that the line 84 is inclined oppositely to the line 78. The portions 40 and 54 are thus the extreme, lower, outer portions of the lenses. The angle between each of the lines 78 and 84 and the vertical may be about forty-five degrees; but a variation of ten or more degrees would not change the invention, depending upon the degree that it is desired to extend the superior, oblique field and to meet individual requirements.

It will be understood, of course, that the upper, lower, inner and outer faces need not be continually curved; as shown in Figs. 4 and 6, for example, the parts 86 and 88 may be substantially straight.

It will be noted that the lenses 28 and 30 of Fig. 1 are more or less substantially oval, but with the major axis of each oval disposed along substantially the direction of the corresponding, superior, oblique axis of the eye, about half way between the lines 20 and 78 and the lines 20 and 84, respectively, of Fig. 1. The same is true of the lenses shown in Figs. 3, 4 and 6. As for the lenses illustrated in Figs. 2 and 5, they are not so nearly oval as in the case of Figs. 1, 3, 4 and 6, but they, too, are oval-like, and their major axes are similarly disposed. The shape of the upper portions of the lenses is not so essential; but the substantially enlarged fields 40 and 54 of the lenses are in all cases disposed substantially symmetrically with respect to, or along, the oblique outward and downward directions of the superior oblique axes of the corresponding eyes so as to provide substantial areas for increasing the superior oblique corrective field of indirect oblique side-glance "near" vision of the corresponding lens, outward and downward through the said portions 40 and 54. The term "substantially oval-like in shape" will, therefore, be used in the claims in this sense, as describing any of the shapes illustrated in the drawing and, in fact, any other standard shape, the substantially oval-like shape being produced by the presence of the additional lower field 40 or 54.

Further modifications will obviously occur to persons skilled in the art, and all such are considered to fall within the spirit and scope of the invention, as defined in the appended claims.

What is claimed is:

1. An ophthalmic corrective lens substantially oval-like in shape and having upper, lower, inner and outer faces, the lens being adapted to be positioned before the eye of a wearer with the inner face adjacent to the wearer's nose, and the extreme corrective lower and outer portion of the lens, beyond the periphery of the upper and the intermediate portions of the said outer face, and without otherwise substantially increasing the lens field, being substantially enlarged along substantially the oblique outward and downward direction of the superior oblique axis of the eye so as to provide a substantial area for increasing the superior oblique corrective field of indirect oblique side-glance near vision outward and downward through the said lower and outer portion of the lens when an approximately central portion of the lens is positioned directly before the eye of the wearer.

2. An ophthalmic mounting comprising a bridge and two corrective lenses substantially oval-like in shape and each having upper, lower, inner and outer faces; the inner faces being positioned adjacent to the bridge; the extreme corrective lower and outer portions of the lenses, beyond the peripheries of the upper and the intermediate portions of the corresponding said outer faces, and without otherwise substantially increasing the lens fields, being substantially enlarged along substantially the oblique outward and downward directions of the superior oblique axes of the corresponding eyes so as to provide substantial areas for increasing the superior oblique corrective fields of indirect oblique side-glance near vision outward and downward through the said lower and outer portions of the corresponding lenses when approximately central portions of the lenses are positioned directly before the corresponding eyes of the wearer; and the said extreme corrective lower and outer portions extending outwardly and downwardly in opposite directions.

FREDERICK A. STEVENS.